United States Patent [19]

McCallum et al.

[11] Patent Number: 4,890,123

[45] Date of Patent: Dec. 26, 1989

[54] PRINT CARTRIDGE

[75] Inventors: Robert S. McCallum, Terra Cotta; Dale E. Hendrikx, Bowmanville, both of Canada

[73] Assignee: Delphax Systems, Mississauga, Canada

[21] Appl. No.: 226,489

[22] Filed: Aug. 1, 1988

[51] Int. Cl.⁴ .............................................. G01D 15/00

[52] U.S. Cl. ...................................... 346/159; 346/155

[58] Field of Search .................... 346/159, 155, 139 C; 400/119; 358/300

[56] References Cited

U.S. PATENT DOCUMENTS 4,494,129 1/1985 Gretchev ............................ 346/159

FOREIGN PATENT DOCUMENTS 1309664 3/1973 United Kingdom ................ 346/159

*Primary Examiner*—Arthur G. Evans

*Attorney, Agent, or Firm*—Rogers & Scott

[57] ABSTRACT

There is disclosed a print cartridge for use in charge transfer imaging comprising a dielectric substrate, driver electrodes extending in a first direction along the substrate, a dielectric layer covering the electrodes, and finger electrodes extending in a second direction across the dielectric layer and defining apertures having edge structures straddling the driver electrodes. A dielectric spacer covers the finger electrodes and defines apertures corresponding to the apertures of the finger electrodes. The dielectric spacer itself is covered by a screen electrode which also defines apertures corresponding to the apertures of the dielectric spacer and the finger electrodes. The apertures of the finger electrodes, the dielectric spacer, and the screen electrode collectively define a plurality of blind holes. A plurality of passages having first and second ends are provided through one or more components of the cartridge, the first ends adapted for communication with a fluid supply and the second ends opening into the blind holes. Fluid from the supply passes through the passages into the apertures to exit from the screen electrode apertures to help prevent ingress of toner particles to the blind holes and to provide a purging effect to dislodge particles collecting in the holes.

In a further aspect of the present invention the fluid supplied to the cartridge is a gas other than air.

15 Claims, 7 Drawing Sheets

PRINT CARTRIDGE

FIELD OF INVENTION

This invention relates to charge transfer imaging and more particularily to printers utilising charge transfer imaging and to print cartridges used in such printers.

DESCRIPTION OF PRIOR ART

In charge transfer imaging, a pattern of charge corresponding to a desired image is formed as a latent charge image on a dielectric surface such as the surface of a print drum or image cylinder. The dielectric surface is then moved past a toner brush to cause toner of opposite charge to adhere to charged areas of the dielectric surface, and thus, to form a toner image. The toner image then passes through a nip between the drum and a pressure roller and is transferred and fused simultaneously, or in separate operations, to a copy material, for example copy paper, which passes through the nip with the toner image. After the transfer and fusing operations, the dielectric surface is treated to remove any residual toner and charge.

Various forms of apparatus have been developed to produce the pattern of charge, perhaps the most successful being apparatus in which charged particles are generated in the air by applying high frequency voltage between electrodes. In particular, U.S. Pat. No. 4,155,093 to Fotland et al discloses the generation of charged particles by breakdown of a gas by an electrical field between conducting electrodes separated by a dielectric. By applying the varying potential difference across the electrodes, an electrical discharge is produced and charged particles are extracted from the discharge by a d.c. potential which provides an electric field between one of the electrodes and an image receiving dielectric material so that the particles are transfered to the dielectric material to form a latent image.

This patent further discloses a matrix charged particle generator for the formation of characters by dot matrix electrical charges on the dielectric surface. The generator comprises a sheet of dielectric material provided with electrodes on opposite sides thereof, the electrodes on the side of the dielectric material nearest the surface on which the charge is to be deposited having edge structures defined by apertures from which the charged particle can be discharged, in the above described manner, on to complementary areas of the dielectric surface.

A further development of this principle is disclosed in U.S. Pat. No. 4,160,257 to Carrish, which describes a charged particle generator in which, in addition to a high frequency potential applied between a first driver electrode and a second finger electrode separated by a dielectric member, a lesser constant potential is applied to a screen electrode, which is separated from the finger electrode by a second dielectric member. This use of the screen electrode has been found to improve the quality of the image produced.

As use of such generators, in the form of print cartridges, has become more widespread, the improvement and development of cartridges has continued and examples of such developments may be found in U.S. Pat. No. 4,267,556 to Fotland, U.S. Pat. No. 4,494,129 to Gretchev, and U.S. Pat. No. 4,679,060 to McCallum et al.

As mentioned above with reference to U.S. Pat. No. 4,160,157, this form of cartridge features apertures in the finger electrodes, and also corresponding apertures in the screen electrode and the second layer of dielectric material. Thus, such cartridges feature a large number of blind holes from which charged particles are discharged towards the dielectric surface which is commonly a print drum. Obviously, any obstruction or blockage of these blind holes will affect the performance of the cartridge and the quality of the image produced.

The toner used in charge transfer printers is in the form of a fine dust and is, therefore, difficult to contain to the brushes of the toner applicator, the drum surface and the residual toner remover. Accordingly, there is often some fine toner free in the air in the vicinity of the print drum. These fine toner particles may collect in the apertures of the cartridge, particularly the apertures in the screen electrode.

A solution to this problem of the apertures becoming blocked or obstructed is proposed in U.S. Pat. No. 4,426,654 to Tarumi, in which the apertures in the finger electrodes are continued through the dielectric member to the driver electrodes, that is, the resulting holes in the cartridge are open ended. While this may assist to prevent stagnation of air within the apertures it is still likely that toner particles will collect in the apertures. Also, the provision of apertures in the dielectric material and the driver electrodes complicates the assembly of a print cartridge having the desired mutually transverse electrodes to create the charge generating matrix.

In addition to the toner particles which may collect, other materials tend to build up on the dielectric layer in the apertures due to the electrical discharges taking place. These other materials, generally referred to as corona byproducts, affect print quality and are thought to be produced as a result of electrical discharges in the air in the presence of water vapour and other particles, possibly airborne pollutants. As currently available cartridges operate by creating charges in atmospheric air, it would be necessary to control the quality of the air in the environment of the printer to reduce the rate of build up of corona byproducts. Clearly this would be inconvenient and uneconomic as printers are most frequently used in offices in which such a level of environment control is normally unnecessary.

It has also been found that the efficiency of charge transfer from a cartridge to a dieletric image receiving surface is improved if the charge transfer is carried out in various gases other than air. However, present cartridge designs would require the cartridge and image receiving surface to be immersed in the chosen gas. This would involve the supply of large volumes of gas, the expense of which would not justify the increase in efficiency obtained.

SUMMARY OF THE INVENTION

Accordingly, it is an object of the present invention to provide a print cartridge in which the apertures may be kept relatively free of toner particles.

It is a further object of the present invention to provide a cartridge in which a clean chosen gas or a gas other than air, may be supplied to the apertures.

In one of its aspects the present invention provides a print cartridge for use in charge transfer imaging comprising driver electrodes extending in a first direction a dielectric layer on the electrodes, and finger electrodes extending in a second direction across the dielectric layer and defining apertures having edge structures straddling the driver electrodes. A dielectric spacer covers the finger electrodes and defines apertures corresponding to the apertures of the finger electrodes. The dielectric spacer itself is covered by a screen electrode which also defines apertures corresponding to the apertures of the dielectric spacer and the finger electrodes. The apertures of the finger electrodes, the dielectric spacer, and the screen electrode collectively define a plurality of blind holes. A plurality of passages having first and second ends are provided through one or more components of the cartridge, the first ends adapted for communication with a fluid supply and the second ends opening into the blind holes. Fluid from the supply passes through the passages into the apertures to exit from the screen electrode apertures to help prevent ingress of toner particles to the blind holes and to provide a purging effect to dislodge particles collecting in the holes.

In a further aspect of the present invention the fluid supplied to the cartridge is a gas other than air.

BRIEF DESCRIPTION OF THE DRAWINGS

These and other aspects of the invention will now be described with reference to the accompanying drawings in which.

DETAILED DESCRIPTION OF PREFERRED EMBODIMENTS

Figure 1:
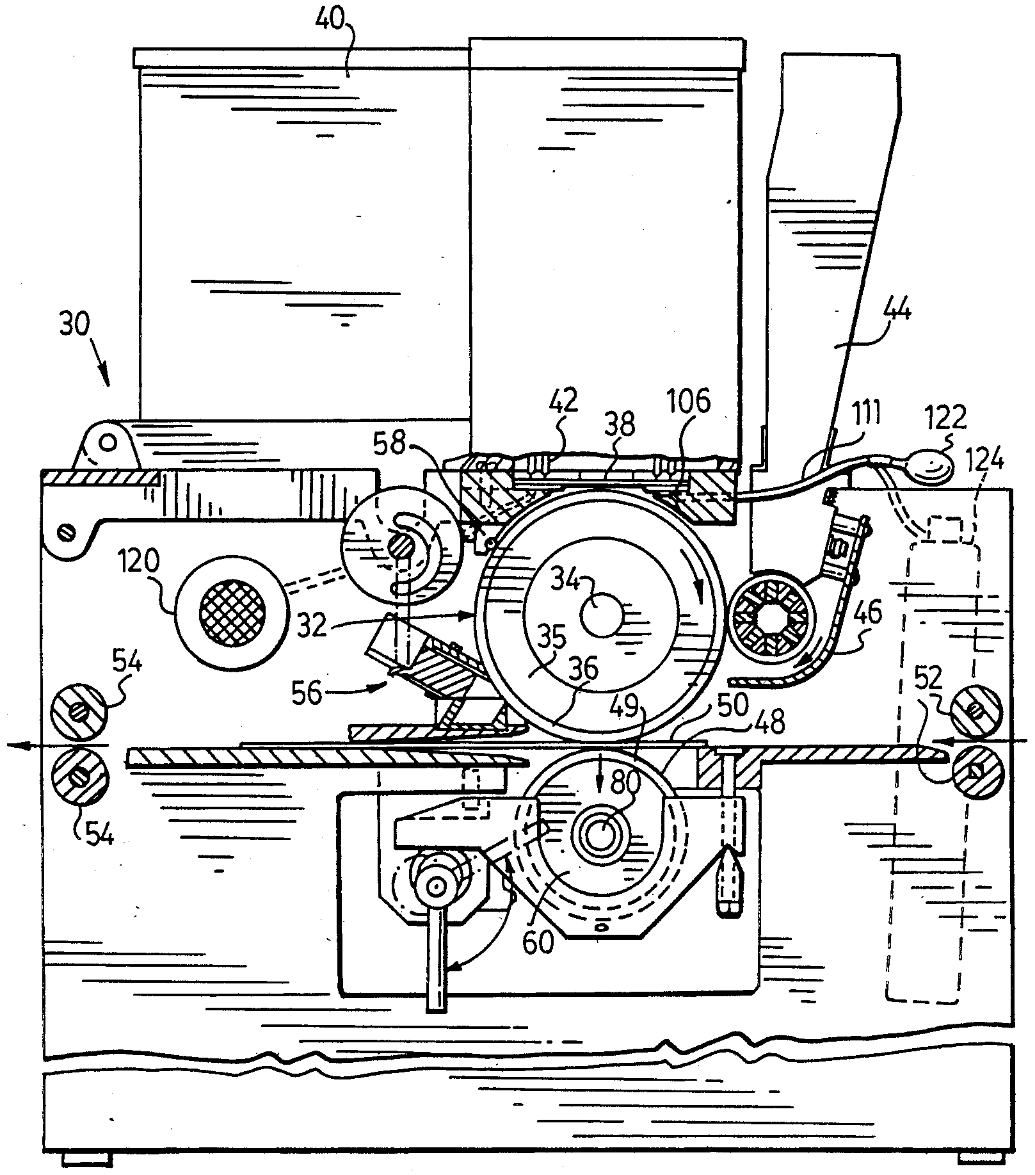
FIG. 1 a side view of an exemplary printer containing a print cartridge in accordance with a first embodiment of the present invention.

Reference is made first to FIG. 1 which shows somewhat schematically a printer 30 incorporating a first embodiment of a print cartridge according to the present invention. This printer is illustrated primarily to demonstrate a preferred environment for the invention but other printers or charge transfer apparatus could benefit from the use of the invention.

A cylinder or drum 32 is mounted for rotation about an axis 34 and has an electrically conductive core 35 coated in a dielectric layer 36 capable of receiving a charge image from a print cartridge 38 driven by an electronic control system 40 and connected to the cartridge 38 by electrical connectors 42. As the drum rotates in the direction shown, a charge image is created by the cartridge 38 on the outer surface of the dielectric layer 36 and comes into contact with toner supplied from a hopper 44 by a feed mechanism 46. The resulting toner image is carried by the drum 32 towards a nip formed with a pressure roller 48 having a compliant outer layer 49 positioned in the path of a receptor such as a paper sheet 50 which enters between a pair of feed rollers 52 driven with the drum 32 and roller 48. The pressure in the nip is sufficient to cause the toner to transfer and fuse on to the receptor 50. The paper leaves the printer 30 between a pair driven of output rollers 54.

After passing through the nip between the cylinder 32 and the roller 48, any toner remaining on the surfaces of the dielectric layer 36 is removed by a scraper blade assembly 56, and any residual charge remaining on the surface is neutralized by a discharge head 58 positioned between the scraper blade assembly 56 and the cartridge 38.

Figure 2:
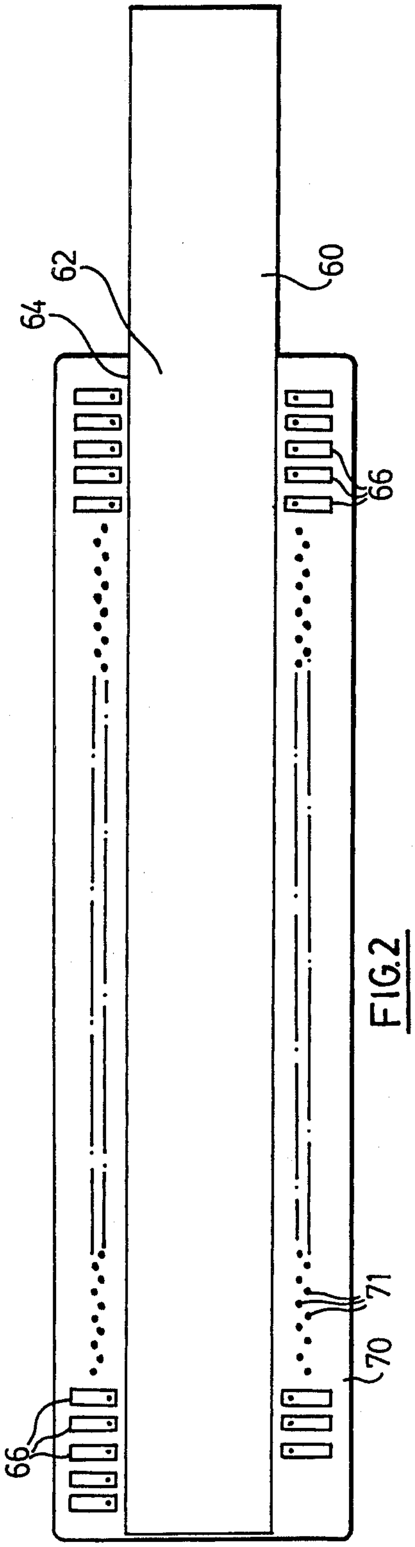
FIG. 2 is a top view, with reference to FIG. 1, of the print cartridge of FIG. 1 drawn to a larger scale.

Reference is next made to FIG. 2, which illustrates the first embodiment of print cartridge 38. In this view, the cartridge is shown from the top as it would appear in the printer of FIG. 1, with a handle 60 extending beyond the, active part of the cartridge for handling the cartridge during engagement in the printer. The handle is an extension of a rigid spine 62 of aluminum and which is separated from the charge producing or discharge portion of the cartridge by a layer of double sided insulating adhesive tape 64 (which will be seen in FIG. 4). End contacts 66 can be seen extending to either side of the, espine 62 supported by a printed circuit board 70 Further, intermediate finger electrode contacts 69 (FIG. 4) also extend to either side of the spine, though they are sandwiched between a base member or bottom board 68 (better seen in FIG. 3) and the printed circuit board 70 and are normally only visible through contact apertures 71 i the board 70. The bottom board 68 has a central slot 72 positioned about angled rows of small openings 73 in a screen 74.

The general arrangement of the laminates forming the cartridge will be described with reference to FIG. 4, which is drawn, from above the cartridge with parts of layers removed to show other layers. Starting with the top part (as drawn) and working downwardly through the layers, the spine 62 is attached to the double-sided adhesive tape 64 and this, in turn, is attached to the printed circuit board 70. This board, or substrate, is of dielectric material and has printed on its underside sixteen driver electrodes or drive lines, indicated collectively by the numeral 79. Ends of the driver electrodes 79 terminate at printed lead portions 80 which are connected, through plated apertures 81 in the board 70, with inner of the end contacts 66. The driver electrodes 79 are parallel to and separated by a strip of dielectric 82, typically mica, from finger electrodes 84. Each of these finger electrodes defines a slot or appertures 85 having edge structures and extends from one of a plurality of contracts 69 to terminate in a support piece 86 for maintaining the finger electrodes in relationship to one another during cartridge manufacture. Also, the contacts 69 and support pieces 86 are formed integrally with the finger electrodes 84 and the contacts 69 and ends of the support pieces 86 are adhered to two parallel strips of dielectric tape 88, preferably KAPTON (a trade mark of DuPont).

Below the finger electrodes 84 is a layer of solder mask 91 and a dielectric separator layer 92, preferably of VACREL (trade mark of DuPont), each having respective parallel slots 94, 95 in alignment with the slots 85 in the finger electrodes where electrostatic discharges takes place in the manner described in the, aforementioned U.S. Pats. The layer 92, is positioned over the screen 74 which is connected to a contact 96 by attachment to a printed line (not shown) on the underside of the pr:nted circuit board 70, and which is in turn connected to the contact 96 through a plated aperture 97.

Finally, a layer of double-sided adhesive tape 93 is placed over and around the screen 74 to affix the bottom board to the assembly.

Figure 4:
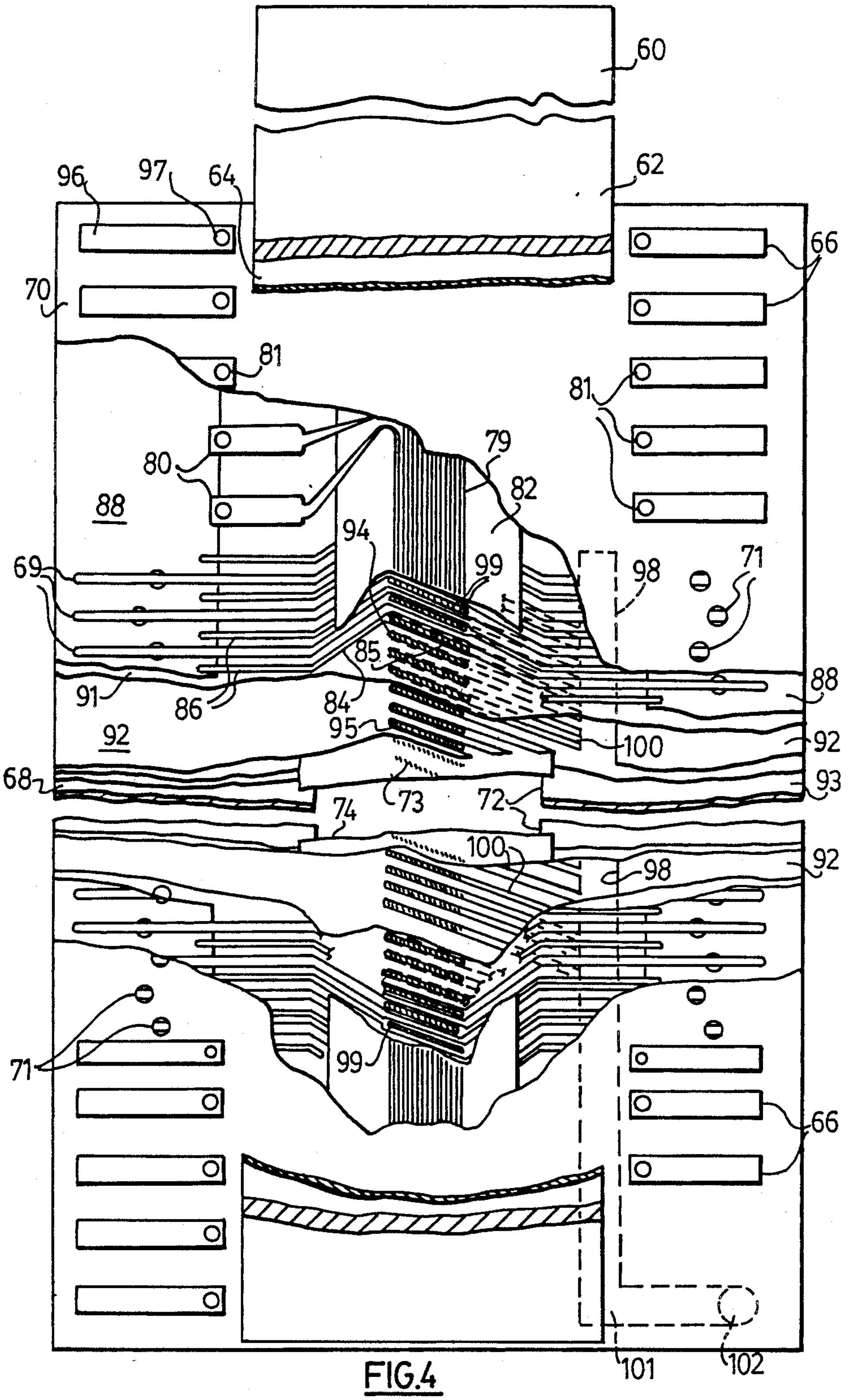
FIG. 4 is a fragmentary view with layers broken away of the cartridge of FIG. 1, drawn from above the cartridge to show the various layers and their relationships.

The above description of FIG. 4 gives an overview of the arrangement of the various layers in the cartridge 38.

Such a cartridge 38 may be manufactured using conventional methods, for example the method substantially as described in U.S. Pat. No. 4,679,060. In short, the contacts 66, 96, the driver electrodes 79, and the printed lead portions 80 are formed by phoroetching a plated substrate to form the printed circuit board 70. The apertures 81, 97 are then plated to form the desired electrical connections between the underside and top surface of the boaard 70, and the contact apertures 71 drilled through the board 70. Next dielectric 82 is affixed over the driver electrodes 79 with a suitable adhesive; the finger electrodes 84 are formed by etching a stainless steel foil and are adhered to the Kapton tape 88 for maintaining the spaced relationship of the contacts during assembly. Following this electrodes 84 and tape 88 are affixed to the underside of the board 70 and the dielectric 82. The assembly is then coated with solder mask 91 (1 mil. thick) and the separator layer 92 (4 mil. thick) which are photoetched to provide the slots 94, 5. The screen 74 is formed by etching a stainless steel foil and affixed to the assembly before application of the double sided tape 93 and bottom board 68 as described above. This assembly is then secured to the spine 62 by means of the double sided tape 64.

Up to this point the cartridge as described is typical of a conventional cartridge. It will be noted that the screen openings 73, the slots 94, 95 in the solder mask 91 and separator layer 92, and the finger electrode slots 85, form blind holes 99 and thus produce dead spaces of air behind the screen 74. In conventional cartridges it has been found that toner particles collect in the screen openings 73 at the mouth of the holes. Obviously, such a buildup of particles interferes with the operation of the cartridge. In an attempt to allievate this problem the present invention provides a purging gas supply into the holes 99 which exits through the screen openings 73 and thus helps to prevent the buildup of toner in the openings.

Figure 3:
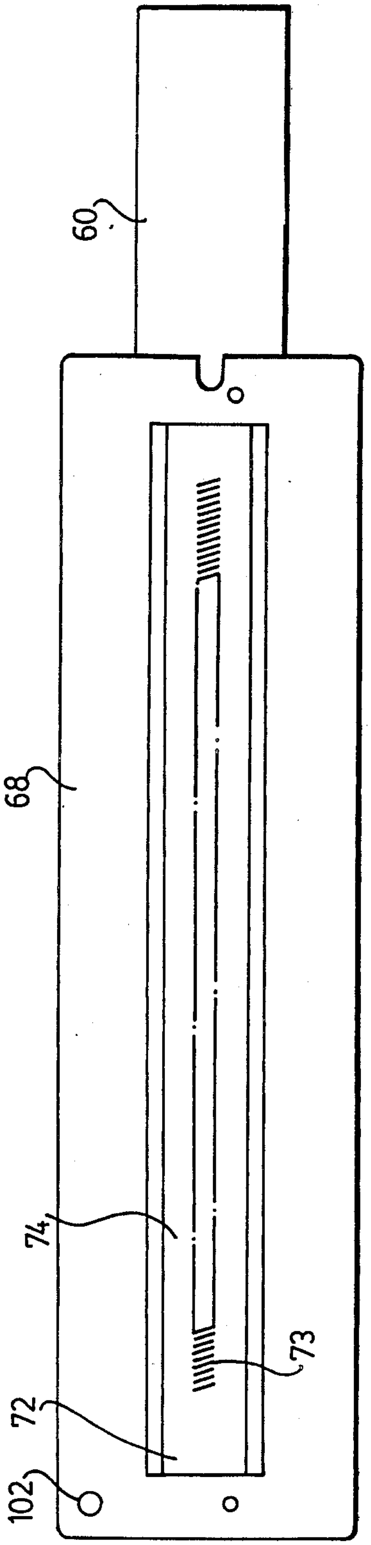
FIG. 3 is a view from below of the print cartridge of FIG. 2.

In the first embodiment illustrated in FIGS. 2, 3 and 4, gas is supplied to the holes 99 through a header defined by a groove 98 etched in the separator layer 92 .from which a plurality of passages 100 extend to the holes 99. One end of the groove 98 is closed and the other communicates with a groove 101 in the upper side of the bottom board 68. This groove 101 leads to an aperture 102 in the underside of the board 68, as is shown in FIG. 3.

Figure 5:
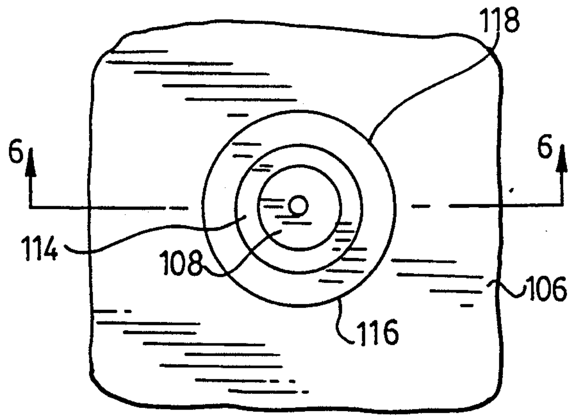
FIG. 5 is a top view from above of a portion of the cartridge mounting of the printer of FIG. 1 drawn to a larger scale.
Figure 6:
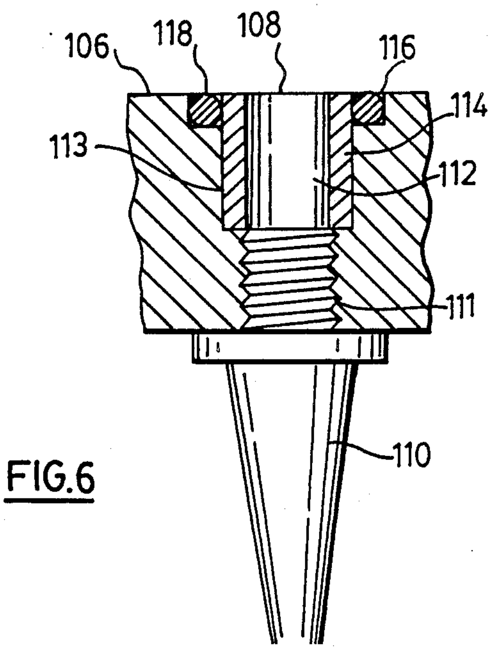
FIG. 6 is a sectional side view of line 6—6 of FIG. 5.

The gas supply for the cartridge may be in the form of any suitable pump, fan or gas cylinder and communicates with the aperture 102 through a corresponding opening provided in the cartridge mounting 106 (FIG. 1), details of which are shown in FIGS. 5 and 6. The mounting 106 has a smooth planar surface on which the bottom board 68 rests, and is provided with an opening 108 in communication with a hose connector 110, for connection to a hose 111 (FIG. 1) leading from the gas supply. The hose connector 110 is threaded at 111 into a lower portion of an aperture 112 through the mounting 106. The upper portion of the aperture 112 has an enlarged portion 113 to receive a sleeve 114 and has a still further enlarged portion 116 to receive a resilient O-ring 118 which extends above the face of the mounting 106 to form a seal between the mounting and the bottom board 68. As mentioned above, a continuous gas supply may be provided by means of an air pump 120 (FIG. 1) provided with a filter which draws and filters air from the exterior of the printer and pumps it through the connecting hose and into the cartridge. Alternatively, the gas supply may be provided periodically to purge the holes, and in this case a simple aspirator bulb 122 (FIG. 1) may be used for activation by an operator. However, rather than supplying air from the printer environment, which includes water vapor and various other airborne particles all of which tend to lead to the build up of corona byproducts on the dielectric 82 at the end of the blind holes, clean air can be supplied through tubing from a central source, or from a refillable gas cylinder 124 (FIG. 1).

Figure 7:
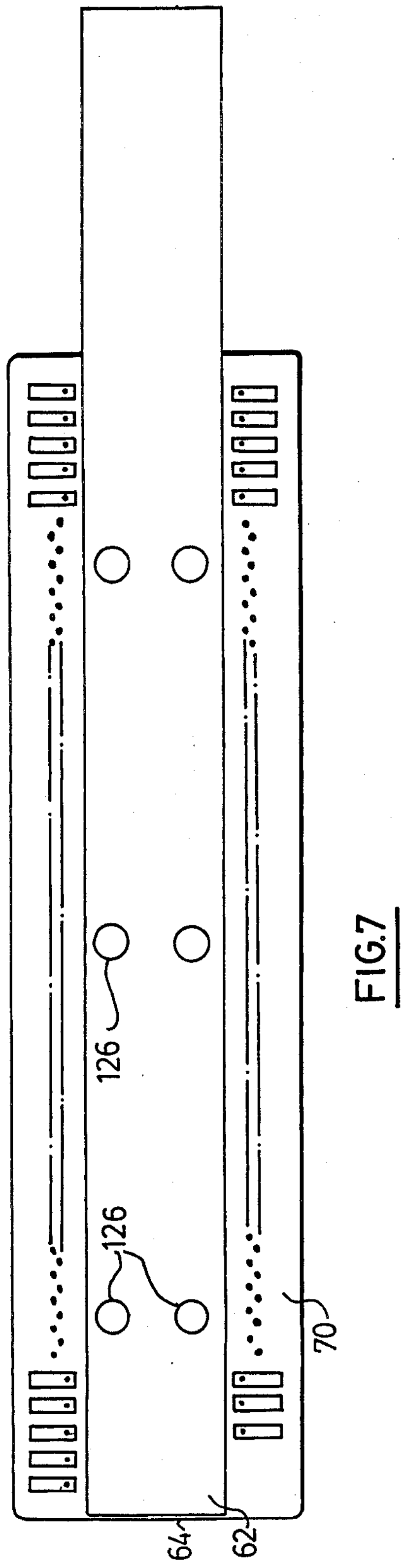
FIG. 7 is a top view a further embodiment of the print cartridge in accordance with the present invention.
Figure 8:
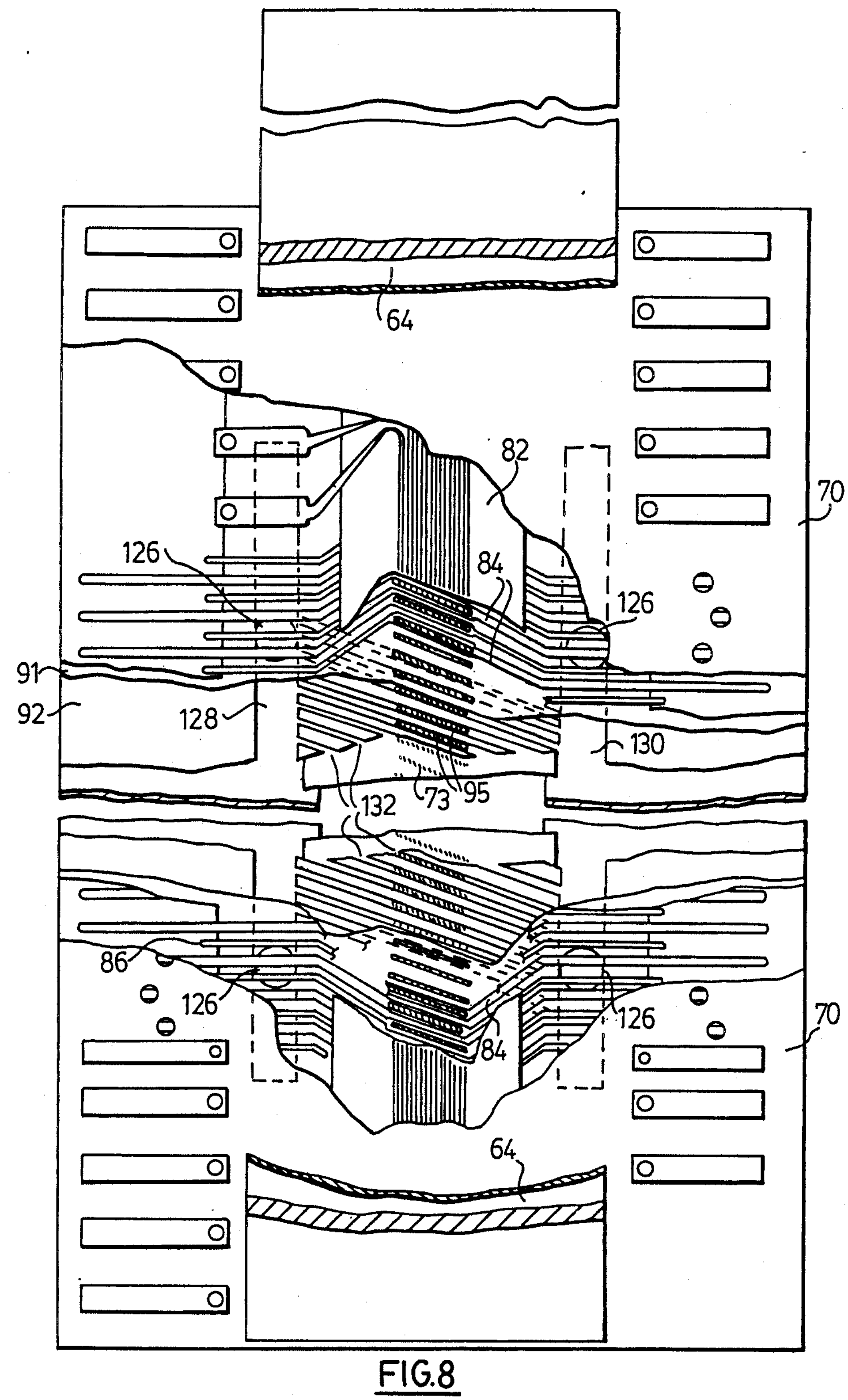
FIG. 8 is a similar view to FIG. 4 but showing the cartridge of FIG. 7.

Reference is now made to FIGS. 7 and 8 which illustrate a further embodiment of the present invenrion. The cartridge is of similar configuration to the embodiment described above and only differs in the manner which the gas supply is provided. If reference is made first to FIG. 7 it will be noted that six apertures 126 are provided in the spine These apertures 126 continue through the double sided tape 64 (FIG. 8) the printed circuit board 70, around the finger electrodes 84 and support pieces 86, and the solder mask 91 into headers formed of longitudinal grooves 128, 130 in the separator layer 92 on either side of the dielectric layer 82. A plurality of diagonal passages 132, also formed in the separator layer 92, extend between the grooves 128, 130 and the slots 95 in the separator layer Thus, by means of suitable connections such as those described previously, gas may be supplied through the apertures 126 into the 95 in the separator layer exit rhrough the screen openings 73. This allows a gas supply to be routed through a printer from above the cartridge where, for example, there is insufficient space below the cartridge to route a gas supply hose as described with reference to the first embodiment.

Figure 9:
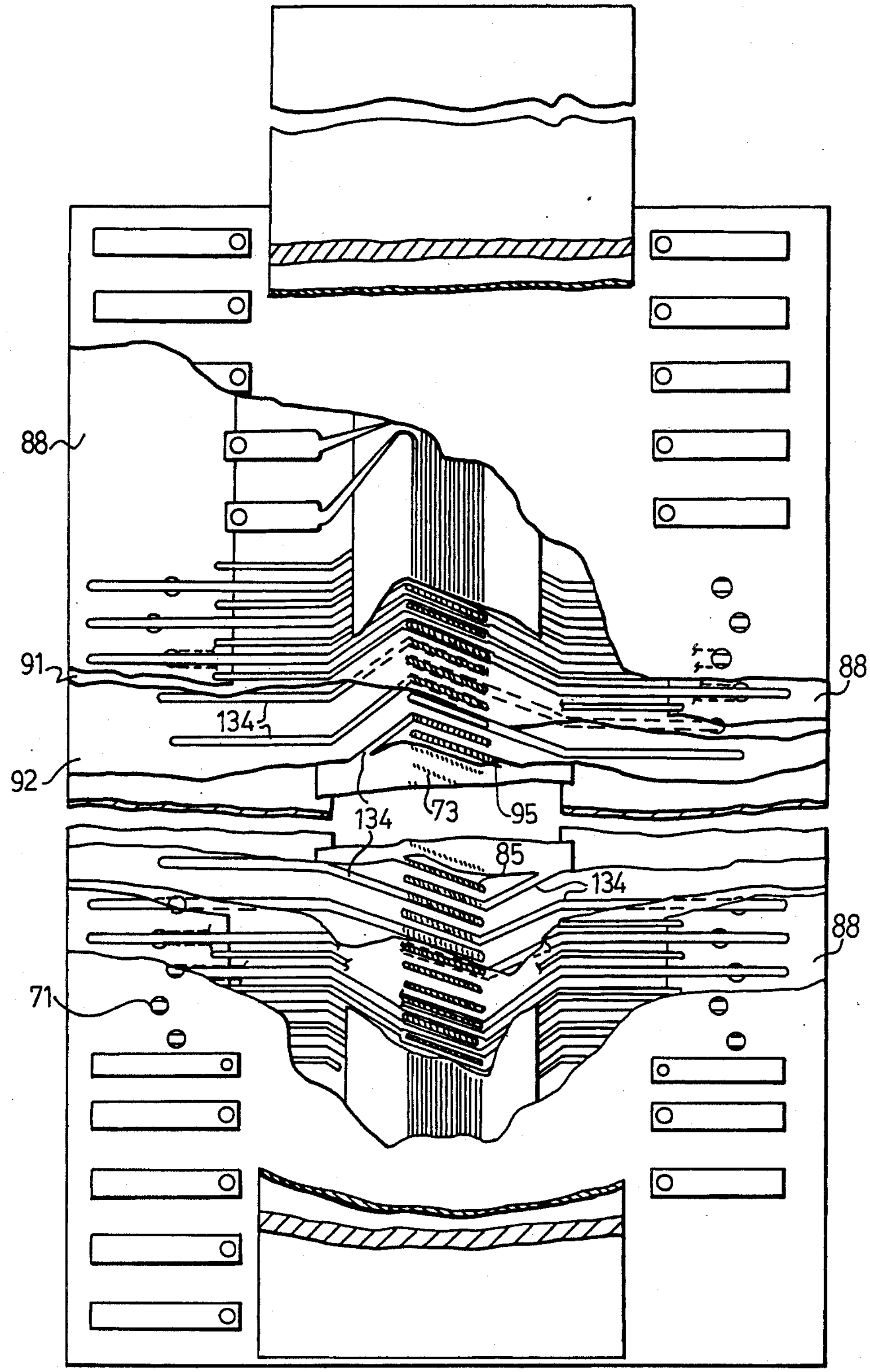
FIG. 9 is a similar view to FIGS. 4 and 8 of a still further embodiment of the cartridge in accordance with the present invention.

Reference is now made to FIG. 9 which illustrates a still further embodiment of the present invention. The cartridge shown in FIG. 9 is of similar configuration to the cartridges described above, apart from the gas supply means which are provided in a different manner. In this embodiment the contact apertures 71 are continued throught the tape 88 and the solder mask 91 and terminate in the ends of passages 134 formed in the separator layer 92. These passages 134 extend inwardly below the corresponding finger electrodes 84 (and solder mask 91) to the slots 95 provided in the separator layer at the finger electrode apertures 85. Thus, purging gas may be pumped through the contact apertures 71 and the associated passages 134 into the holes to exit through the screen openings 73.

Figure 11:
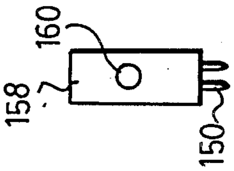
FIG. 11. is an end view of the contacts of FIG. 10 rotated tnrough 9°.
Figure 10:
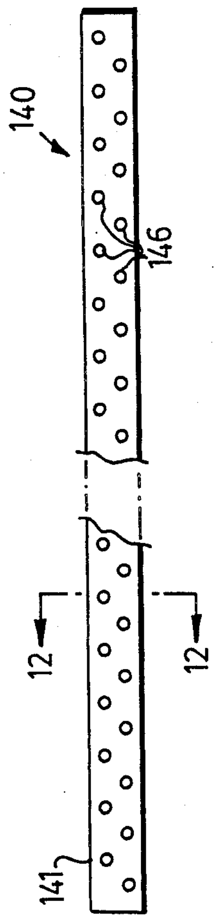
FIG 10. (drawn adjacent FIG. 7) is a view from below of contacts of a printer for use with the cartridge of FIG. 9.
Figure 12:
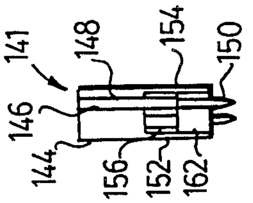
FIG. 12 is a sectional view on line 12—12 of FIG. 10.

The gas supply is provided by means of specially adapted pogo pin contact assemblies 140 as shown in FIGS. 10–12. The drawings illustrate an assembly for one side of the cartridge which includes a longitudinal plastic moulding 141 having a substantially solid upper portion 144 provided with staggered apertures 146 for receiving a sleeve portion 148 of the pogo pins 150. The lower portion has flexible side walls 152, 154 which define a longitudinal passageway 156. One of the end walls 158 of the moulding 141 is provided with an inlet hole 160 for connection to a suitable gas supply, and cross support walls 162 extend across the lower portion of the passageway 156, between each pogo pin 150.

When the assembly rests on the upper face of the printed circuit board 70, the flexible side walls 152, 154 form a seal with the board 70.

In use, gas is pumped in through the aperture 160 into the passageway 156, around the pins 150, into the apertures 71 and around the contacts into the passageways 134.

The gas supply may be provided by any one of the gas supply means described above with reference to the first embodiment.

The possibility of supplying gas directly to a cartridge, as is now possible by use of a cartridge of the present invention, opens a number of further possibilities beyond the purging of toner particles from the screen openings and the reduction in corona by products by use of clean air. Investigation has shown that the voltage necessary to produce a certain current of charged particles flowing from the cartridge to the image receiving surface can be lowered by surrounding the cartridge and image receiving surface in gases other than air. Previously, this could only be achieved by immersing the cartridge and image receiving surface in the chosen gas. However, the cost of supplying the ,necessary volume of gas to achieve this immersion would far outweigh the advantages obtained by using the different gas.

Cartridges in accordance with the present invention are clearly adapted to take advantage of this feature as a chosen gas may be supplied to the blind holes at an economic rate to fill the holes and the small space between the cartridge and the image receiving surface. The volume of gas necessary to achieve this is clearly far less tnan would be necessary if the immersion technique were utilized.

Nitrogen and Argon are among the gases which have been shown to produce a higher charge particle current for a given voltage berween the driver and finger electrodes, when compared with air.

Use of a lower voltage lowers the required specification of the various components of the printer and cartridge, as the electrical insulation of the printer is less demanding, and the components of the cartridge do not have to withstand such high operating voltages.

Thus, the cartridges and printer described above illustrate cartridges and printers adapted to obtain the benefit of a purging gas supply or a clean gas supply of a particular gas. Clearly, the cartridges and printer described herein are only intended to be exemplary and the invention may be incorporated in different forms of cartridge without departing from the scope of the invention.

We claim:

1. A print cartridge for use in charge transfer imaging comprising:
- a dielectric substrate;
- driver electrodes extending generally longitudinally along the substrate;
- a first dielectric layer covering the driver electrodes;
- finger electrodes extending generally transversely across the dielectric layer and defining apertures straddling the driver electrodes;
- a second dielectric layer covering the finger electrodes and defining apertures corresponding to the apertures of the finger electrodes;
- a screen electrode covering the second dielectric layer and defining apertures corresponding to the apertures of the finger electrodes and the second dielectric layer;
- the apertures of the finger electrodes, the second dielectric layer and the screen electrode collectively defining a plurality of blind holes; and
- a plurality of passages being provided through one or more of the components of the cartridge and having respective first and second ends, the first ends adapted for communication with an external fluid supply and the second ends opening into said blind holes, such that fluid from said supply may exit through the screen electrode apertures to prevent ingress of toner particles to the blind holes and to provide a purging effect to exhaust particles collecting in the holes.

2. A print cartridge as claimed in claim 1, in which the second dielectric layer comprises a solder mask layer covering the finger electrodes and a separator layer, and the passages comprise at least one longitudinal header passage formed in the separator layer to the side of said blind holes and a plurality of subsidiary passages extending through the separator layer from the header passage to the blind holes.

3. A print cartridge as claimed in claim 2 and further comprising a base member mounted over the screen electrode and provided with an aperture for communication between an external gas supply outlet and the header passage in the separator layer.

4. A print cartridge as claimed in claim 2 and further comprising a spine member fixed to the dielectric substrate, an aperture extending through the spine member to the header passage in the separator layer for communication between an external gas supply outlet and the header passage.

5. A print cartridge as claimed in claim 2, in which the finger electrodes extend beyond the dielectric layer to form contacts, the dielectric substrate covering the contacts and defining individual contact receiving apertures in the substrate which extend beyond each contact to the header passage in the separator layer for communication between an external gas supply outlet and said header passage.

6. In a print cartridge for use in charge transfer imaging comprising a dielectric substrate carrying first electrodes extending in a first direction and second electrodes extending in a second direction and having apertures defining edge structures to form a charge generating matrix and separated from the first electrodes by a first dielectric layer, and a third electrode separated from the second electrodes by a second dielectric layer, corresponding apertures being provided in the second electrode, the second dielectric layer, and the third electrode to form blind holes, the improvement comprising a plurality of passages having first ends adapted for communication with an external fluid supply and second ends opening into the said blind holes.

7. Structure as claimed in claim 6, in which the second dielectric layer comprises a solder mask layer covering the finger electrodes and a separator layer, the said passages comprising a longitudinal header passage formed in the separator layer to the side of the said blind holes and a plurality of subsidiary passages through the separator layer from the header passage to the blind holes.

8. Structure as claimed in claim 7, and further comprising a base member mounted over the third electrode and provided with an aperture for communication between an external gas supply outlet and the header passage in the spacer layer.

9. Structure as claimed in claim 7, in which the second electrodes extend beyond the first dielectric layer to form contacts, the dielectric substrate layer covering said contacts and defining contact receiving apertures which extend beyond each of said contacts to the header passage in the separator layer for communication between an external gas supply outlet and said header passage.

10. A print cartridge as claimed in claim 7, and further comprising a spine member fixed to the dielectric substrate, an aperture extending through the spine member to the header passage for communication between an external gas supply outlet and the header passage in the separator layer.

11. A print cartridge for use in charge transfer imaging comprising:

generating means for generating a matrix of charged particles including a plurality of apertures in a face of the cartridge from which the charged particles are emitted;

fluid communication means for communication between an external fluid supply and the generating means; and connecting means adapted for connecting said fluid communication means to an external fluid supply.

12. A print cartridge for use in charge transfer imaging comprising:

a dielectric substrate;

a sheet of dielectric material mounted on said substrate and provided with first and second electrodes on opposite sides thereof;

the second electrode being apertured to define edge structures;

a screen electrode separated from said second electrode by a dielectric member, the screen electrode and dielectric member being apertured for communication between the cartridge exterior and said edge structures; and passages through the dielectric member for fluid communication between a fluid supply and the dielectric member apertures.

13. In a printer comprising support structure, a print cartridge mounted on the support structure and having a dielectric substrate carrying first electrodes extending in a first direction and second electrodes extending in a second direction and having apertures defining edge structures to form a charge generating matrix and separated from the first electrodes by a first dielectric layer, and a third electrode separated from the second electrodes by a second dielectric layer, corresponding apertures being provided in the second electrodes, the second dielectric layer, and the third electrode to form blind holes, a print drum supported on the support structure for receiving a charge image from the print cartridge, toner supply means mounted on the support structure for supplying toner to the print drum, feeding means mounted on the support structure for feeding an image receiving receptor to a nip formed between the drum and a pressure roller mounted on the support structure, where the toner image is transferred to the image receptor, the improvement comprising a plurality of passages provided through at least one of the components of the cartridge, and having first and second ends, the first ends being in communication with fluid supply means mounted on the support structure and the the second ends opening into one of said blind holes, fluid from said supply means exiting through the third electrode apertures to prevent ingress of toner particles to the blind holes and to provide a purging effect to exhaust particles collecting in the holes.

14. Apparatus as claimed in claim 13, in which the fluid supply is provided by actuation of an aspirator bulb by an operator.

15. Apparatus as claimed in claim 13, in which the fluid supply is provided by a pump.

* * * * *